June 4, 1935. L. H. THOEN 2,003,523
THRESHING
Filed Jan. 23, 1931 5 Sheets-Sheet 1

INVENTOR.
Lowell H. Thoen
BY
ATTORNEYS.

June 4, 1935.　　　　　L. H. THOEN　　　　　2,003,523
THRESHING
Filed Jan. 23, 1931　　　5 Sheets-Sheet 2

June 4, 1935.　　　　　L. H. THOEN　　　　　2,003,523
THRESHING
Filed Jan. 23, 1931　　　5 Sheets-Sheet 3

June 4, 1935.  L. H. THOEN  2,003,523
THRESHING
Filed Jan. 23, 1931  5 Sheets-Sheet 4

Fig. 4.

Fig. 5.

INVENTOR.
Lowell H. Thoen
BY
ATTORNEYS.

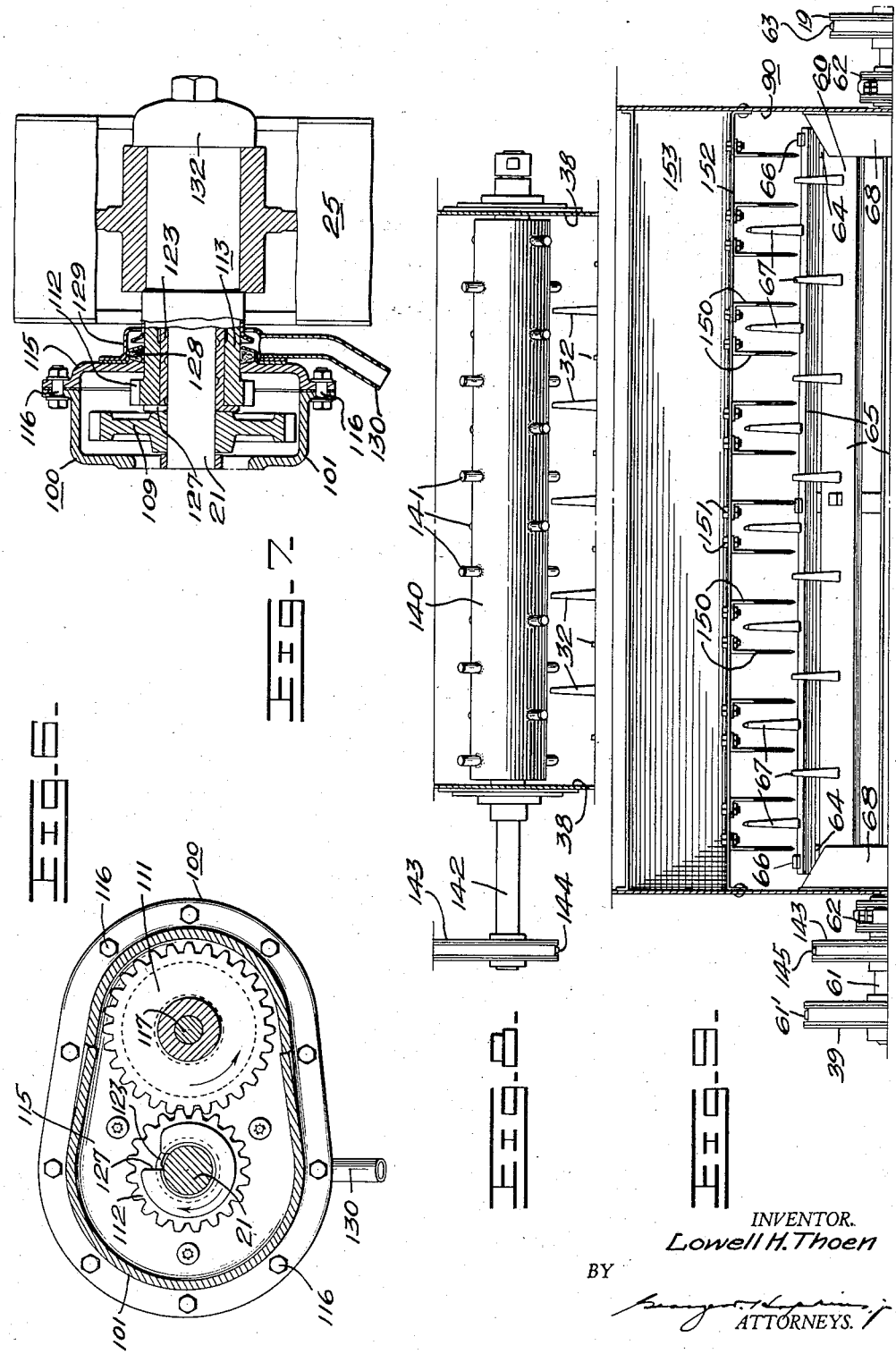

Patented June 4, 1935

2,003,523

UNITED STATES PATENT OFFICE 2,003,523

THRESHING

Lowell H. Thoen, San Leandro, Calif., assignor to Caterpillar Tractor Co., San Leandro, Calif., a corporation of California Application January 23, 1931, Serial No. 510,716

8 Claims. (Cl. 130—27)

My invention relates to threshing machines and particularly to a threshing machine adapted to thresh beans. The objects of my invention are, first, to provide a threshing machine with primary and secondary threshers; second, to provide a thresher comprising co-acting toothed cylinders. This application is for improvements in the machine disclosed in my copending application, Serial No. 505,076, filed December 27, 1930.

Figure 1:
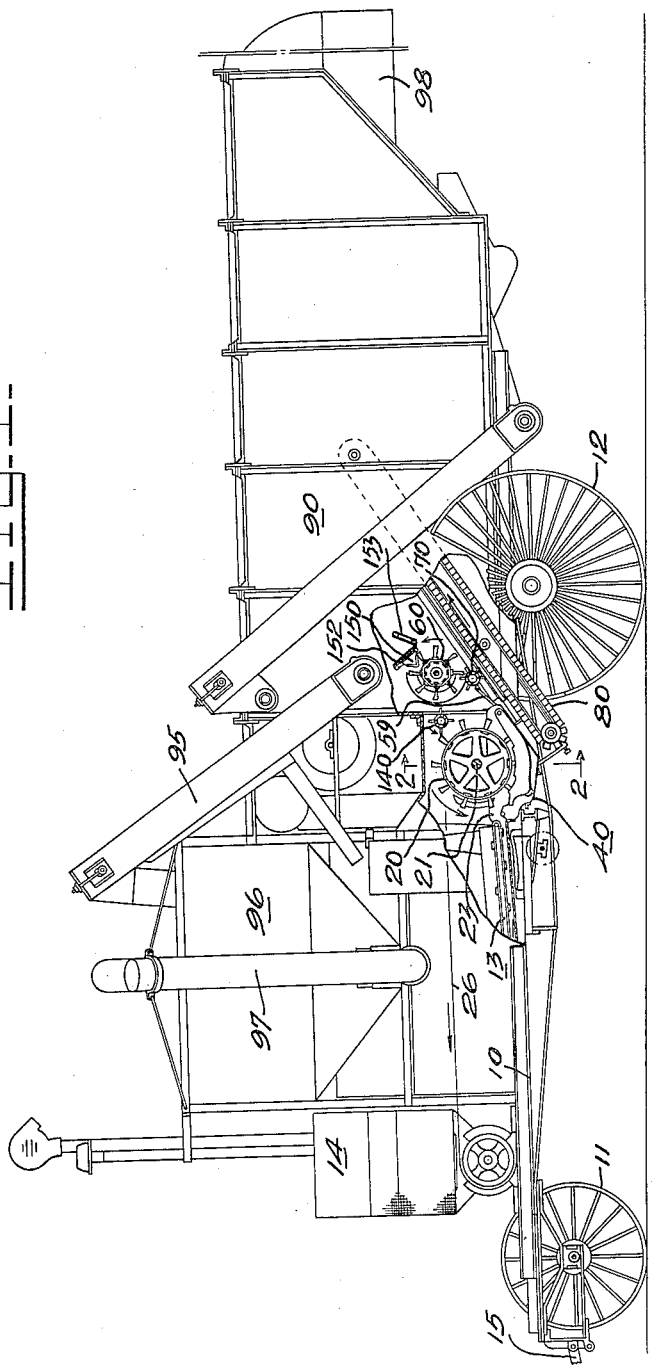
Figure 2:
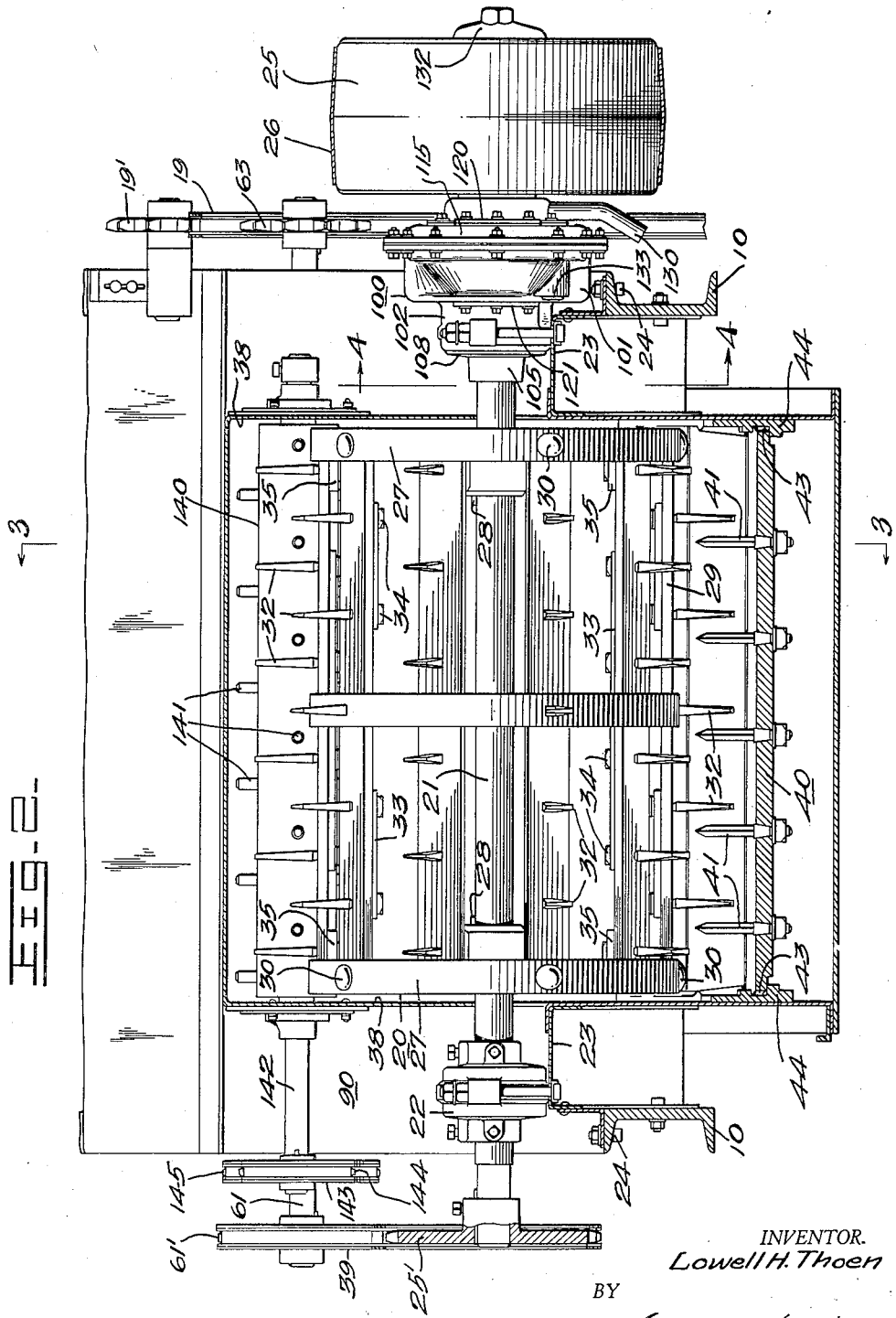
Figure 3:
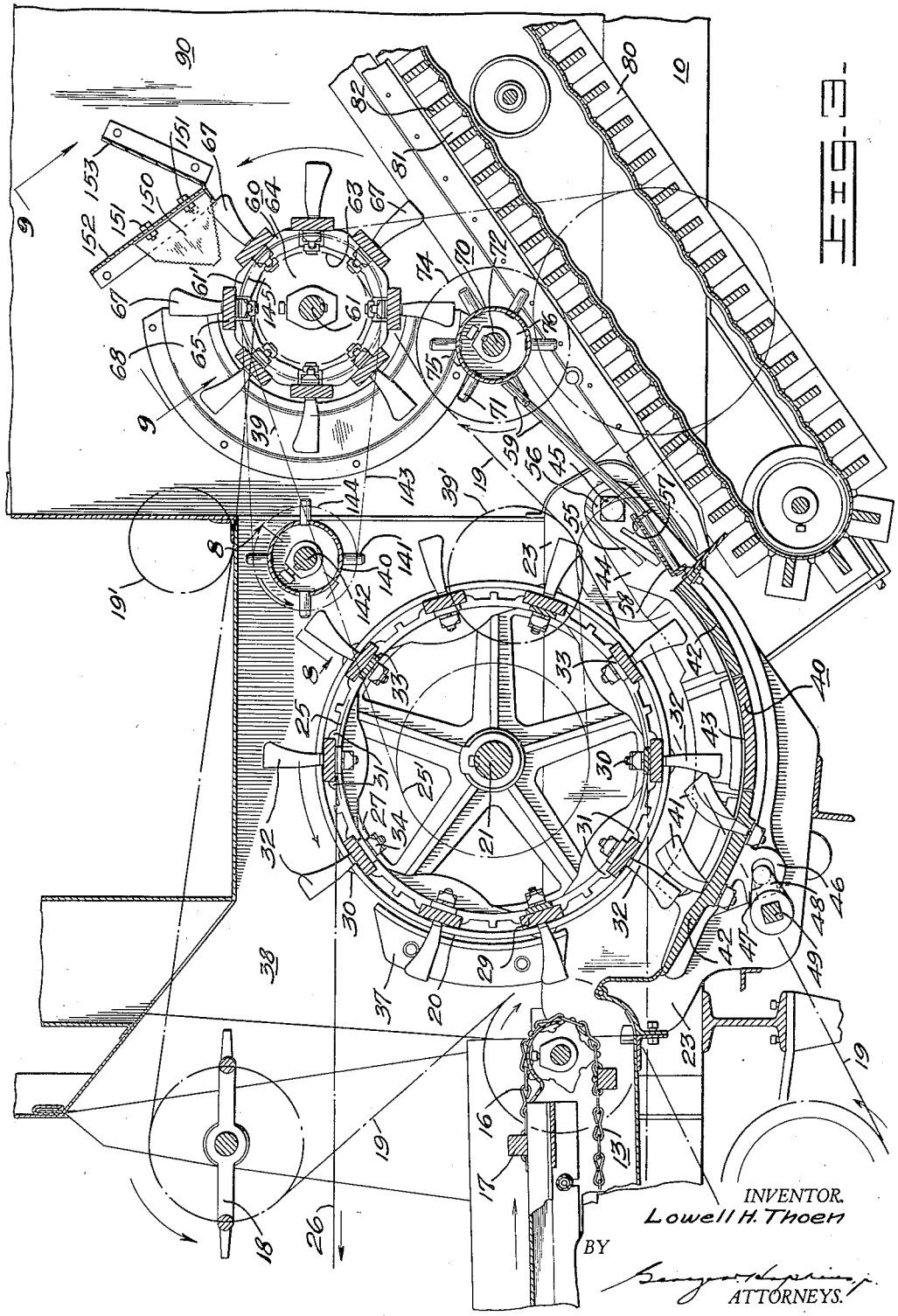

Fig. 1 is a left side elevation of a machine embodying the invention with parts broken away.
Fig. 2 is a sectional view on line 2—2 of Fig. 1.
Fig. 3 is a sectional view on line 3—3 of Fig. 2.
Fig. 4 is a sectional view on line 4—4 of Fig. 2.
Fig. 5 is a sectional view on line 5—5 of Fig. 4.
Fig. 6 is a sectional view on line 6—6 of Fig. 5.
Fig. 7 is a sectional view on line 7—7 of Fig. 5.
Fig. 8 is a view taken on line 8—8 of Fig. 3.
Fig. 9 is a view taken on line 9—9 of Fig. 3.

The invention is shown embodied in a combined harvester thresher provided with the usual main frame 10, front steering wheels 11, rear wheels 12, and a pick-up not shown. The machine disclosed for purposes of illustration is particularly adapted for handling beans but it is to be understood that the invention is not limited to this use. The cut vines are delivered from the pick-up to feeder 13. The vines are fed into a primary thresher comprising cylinder 20 and concave 40 and discharged onto grate bars 59 which extend into separator compartment 90 to a secondary thresher comprising cylinders 60 and 70. The beans are received in the cells of grain carrier 80 and are carried away and cleaned by well known processes and when finally cleaned are conveyed by elevator 95 to bin 96 from which they may be removed as desired by means of auger 97. The vines and pods are discharged at the tail 98.

The various working parts of the machine are driven by auxiliary motor 14 although power may be taken directly from the tractor if desired. The machine is equipped with the usual drawbar 15 for draft connection to a tractor.

Feeder 13 comprises parallel chains 16 to which are fastened cross-bars 17. Co-operating with feeder 13 is beater 18 which is driven by a sprocket chain arranged as indicated by the dot-and-dash line 19 (Fig. 3) to drive other parts, including feeder 13, and to be driven by cylinder 60. Chain 19 is tensioned by idler 19'.

Cylinder 20 is mounted on shaft 21, the left end of which in Fig. 2 is supported in bearing 22 bolted to sub-frame 23 which in turn is bolted at 24 to main frame 10. Sprocket 25' is keyed to the left end of shaft 21 and drives sprocket 61' on shaft 61 of cylinder 60 through chain 39, which is tensioned by idler 39'. The right end of shaft 21 can be supported in the same manner as the left end and provided with pulley 25 for belt 26 which is driven by motor 14. However, under certain conditions of operation, it is desirable to rotate cylinder 20 and the mechanism driven thereby at a lower rate of speed and for this purpose a combined reduction gear and shaft bearing unit 100 is substituted for the usual bearing 22. Unit 100 and bearing 22 are interchangeable and no additional attachments are necessary for the use of unit 100.

Unit 100 comprises casing 101 having cylindrical portion 102 provided with inwardly extending annular flange 103, the inner edge of which defines a circular aperture 104. Collar 105 is fastened by screw 106 to shaft 21 and has a sleeve portion 107 of less diameter than aperture 104, and a flange 108. Bearing 122 supports shaft 21 and sleeve 107 in casing 102, flanges 103 and 108 serving to retain bearing 122 in place. Gear 109 is keyed to shaft 21 and meshes with pinion 110 which has gear 111 integral therewith. Gear 111 meshes with pinion 112 which has sleeve 113 integral therewith, to which pulley 25 is secured by key 114.

Casing 101 is provided with cover 115, the casing and cover having apertured flanges for securing bolts 116. Integral pinion 110 and gear 111 are mounted on stub shaft 117, the ends of which are supported in bearings 118, 119, received in aligned apertures in cover 115 and casing 101 and retained by plates 120 and 121.

Bushings 123, 124, each having one end flanged, are inserted into hollow sleeve 113. The sleeve and its bushings are held on shaft 21 by screw 125 and washer 126. The inner surface of each bushing is provided with a spiral oil carrying groove as shown and the oil is admitted through an opening 127 in the flange of the inner bushing as shown in Fig. 6. Cover 115 is apertured to permit sleeve 113 to extend outwardly to receive pulley 25 and the aperture is provided with a seal 128 and cover 129 in which oil seepage can accumulate and from which it is conveyed away from belt 26 by drain pipe 130. The outer end of sleeve 113 is threaded at 131 to receive threaded cap 132. The casing is supplied with lubricant through filler spout 133.

Cylinder 20 comprises two end wheels 27 fastened by keys 28 to shaft 21 as shown in Fig. 2.

Bars 29 are secured by bolts 30 to wheels 27, and are further positioned thereon by means of lugs 31 formed in the rim of each wheel as shown in Fig. 3. Each bar 29 is apertured to receive teeth 32 which have tapered shanks and which extend through reinforcing strips 33 to receive securing nuts 34. The teeth adjacent the wheels 27 are reinforced by lugs 35 formed in the rim of each wheel as shown in Fig. 2. The vines are prevented from getting around the ends of the cylinder by guards 37 which are fastened to the side walls 38 of the primary thresher compartment.

Co-operating with cylinder teeth 32 are concave teeth 41 which are mounted in the foremost segmental plate 42 as shown in Figs. 2 and 3. The ends of plates 42 are inserted in arcuate slots 43 on the inner side of supporting arms 44 which are pivoted in sub-frame 23 at 45. The front end of each arm 44 is provided with a jaw 46 to receive crank pin 47 on crank 48. The cranks 48 are operated by square shaft 49 which extends through sub-frame 23 where it is provided with an operating crank not shown. By this means the concave and its teeth 41 can be adjusted about pivots 45 to position teeth 41 with respect to cylinder 20.

The rear wall of the primary thresher compartment is open to permit discharge of the threshed beans into separator compartment 90. The rear end of each arm 44 is provided with parallel ridges 55 which serve to prevent rotation of block 56 on pivot 45 relative to arm 44. Block 56 is slotted at 57 to receive the end of plate 58, the other end of plate 58 being supported in the other block 56. Plate 58 is channel-shaped in section as shown in Fig. 3 and the forward depending web bears against the rear edge of the rear-most concave plate 42. The downwardly projecting webs are apertured to receive grate bars 59. These bars extend rearwardly into separator compartment 90 and upwardly toward cylinder 70 which is provided with teeth 71. It will be noted in Fig. 3 that the grate is made up of alternately long and short bars 59, the long bars extending to the surface of cylinder 70, the short bars being in line with teeth 71 which just clear the end of the bars as cylinder 70 rotates.

The threshed material is discharged onto grate bars 59 from which it is picked up by cylinder 70 and fed between cylinders 60 and 70 which are rotated so that their peripheral speeds are different. Cylinder 60 is mounted on shaft 61 which is supported in bearings 62 fastened to the framework of the machine. The right end of shaft 61 in Fig. 9 is provided with sprocket 63 to drive chain 19. Cylinder 60 comprises end wheels 64. The rim of each wheel is octagonal as shown in Fig. 3 thereby providing flat surfaces for attaching the ends of bars 65 by bolts 66. Bars 65 are provided with teeth 67 which co-operate with teeth 71 in cylinder 70. Cylinder 70 comprises a cylindrical body 75 supported on discs 76 the hubs of which are keyed to shaft 72 which is supported in bearings in the side walls of compartment 90. One end of shaft 72 is provided with sprocket 74 for driving by chain 19. The cylindrical body 75 of cylinder 70 is pierced to receive teeth 71. Material is prevented from passing around the end of cylinder 60 by guards 68 which are fastened to the side walls of separator compartment 90.

To prevent return of the material into the primary thresher compartment and to assist in the threshing operation, a cylinder 140, having teeth 141 co-operating with teeth 32 of cylinder 20 is mounted on shaft 142 across the upper rear portion of the compartment. Shaft 142 is equipped with sprocket 144 to be driven by chain 143 from sprocket 145 on shaft 61 of cylinder 60. To prevent material from being carried back over cylinder 60, stationary blades 150 are provided for stripping the material from teeth 67. Blades 150 can be made from the teeth of a sickle bar. The inner ends are turned over and apertured for securing by bolts 151 to plate 152, the rear edge of which is upturned to form a baffle 153. Plate 152 is secured to the side walls of separator 90.

The threshed material is discharged from the secondary thresher onto the grain carrier 80, the beans lodging in cells 81 and the vines resting on the upper edge of slats 82 in the well known manner. The beans are then cleaned and deposited in the bin 96 and the vines and pods are discharged at 98.

I, therefore, claim as my invention:

1. In a threshing machine, a primary thresher comprising a pair of cooperating toothed cylinders, and a series of stationary teeth cooperating with one of said cylinders, a secondary thresher comprising a pair of cooperating toothed cylinders, and a series of stationary teeth cooperating with one of said cylinders, and means to rotate the cylinders in said primary thresher in the same direction, and to rotate said cylinders in said secondary thresher in opposite directions.

2. In a threshing machine, a primary thresher including a rotatable cylinder, a secondary thresher adapted to receive material from said primary thresher and including a cylinder rotatable in the same direction as said primary thresher cylinder, and a member rotatable in the direction of rotation of both said cylinders and cooperating with both said cylinders, to prevent return of threshed material over the primary thresher cylinder and to feed said material to the secondary thresher cylinder.

3. In a threshing machine, a primary thresher including a rotatable cylinder, a secondary thresher adapted to receive material from said primary thresher and including a rotatable cylinder spaced from the primary thresher cylinder, a rotatable member positioned in the space between said cylinders, to prevent return of threshed material over the primary thresher cylinder and to feed said material to the secondary thresher cylinder, and means for rotating said cylinders and member all in the same direction.

4. In a threshing machine, a primary thresher, a grate extending from said primary thresher, a secondary thresher positioned adjacent an end of said grate, said secondary thresher comprising a plurality of rotatable toothed cylinders, one of which cylinders is rotatable in a direction and positioned to deliver material from said grate and to feed said material between it and another of said cylinders, and means cooperating with both of said threshers to prevent return of threshed material over the primary thresher and to feed said material to the secondary thresher.

5. In a threshing machine, a primary thresher including a rotatable toothed cylinder, a grate extending from said primary thresher, a secondary thresher positioned adjacent an end of said grate and including a rotatable toothed cylinder spaced from the primary thresher cylinder, said secondary thresher also including a second toothed cylinder rotatable in a direction opposite to that of said first-mentioned toothed cylinder of said secondary thresher, said second toothed cylinder serving to remove material from said grate and to feed said material between it and said first-mentioned cylinder of said secondary thresher, a rotatable member positioned between said primary thresher cylinder and the first-mentioned cylinder of said secondary thresher to prevent return of threshed material over the primary thresher cylinder and to feed said material to the secondary thresher, and means for rotating the member, the primary thresher cylinder and the first-mentioned cylinder of said secondary thresher all in the same direction.

6. In a threshing machine, a primary thresher including a rotatable toothed cylinder, the teeth of said cylinder being substantially flat-sided threshing blades, a secondary thresher adapted to receive material from said primary thresher, said secondary thresher including oppositely rotatable cylinders having interengaging teeth, the teeth on one of said secondary thresher cylinders being flat-sided threshing blades and the teeth on another of said secondary thresher cylinders being studs, and a rotatable cylinder having studs forming teeth adjacent the teeth of said primary thresher cylinder, and cooperating with both of said threshers to prevent return of material over the primary thresher cylinder and to feed said material to the secondary thresher.

7. In a threshing machine, a primary thresher including a rotatable toothed cylinder, a secondary thresher including a plurality of rotatable toothed cylinders, a rotatable toothed member cooperating with both of said threshers to prevent return of material over the primary thresher and to feed said material to the secondary thresher, and an interrelated driving connection for operating all of said cylinders at a constant speed relationship, said driving connection including means for rotating one of the cylinders of the secondary thresher, the primary thresher cylinder and the rotatable member all in the same direction and also for rotating another of said secondary thresher cylinders in an opposite direction.

8. In a threshing machine, a primary thresher including a rotatable toothed cylinder and a stationary toothed concave, a secondary thresher including a pair of toothed cylinders having interengaging teeth and rotatable in opposite directions, said secondary thresher being positioned to receive material from said primary thresher, a rotatable toothed member positioned between said threshers to prevent return of material over the primary thresher and to feed said material to the secondary thresher, and stationary members forming teeth cooperating with the teeth on one of the secondary thresher cylinders to prevent return of material over the secondary thresher.

LOWELL H. THOEN.